United States Patent
Poikselkä et al.

(10) Patent No.: US 7,154,907 B2
(45) Date of Patent: Dec. 26, 2006

(54) METHOD AND SYSTEM FOR RESETTING NODES IN COMMUNICATION SYSTEMS

(75) Inventors: Miikka Poikselkä, Espoo (FI); Petteri Ylä-Outinen, Ojakkala (FI); Robert Sugar, Budapest (HU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/431,384

(22) Filed: May 8, 2003

(65) Prior Publication Data

US 2004/0047301 A1    Mar. 11, 2004

Related U.S. Application Data

(60) Provisional application No. 60/378,951, filed on May 10, 2002.

(51) Int. Cl.
*H04J 3/18* (2006.01)
*H04J 3/22* (2006.01)

(52) U.S. Cl. .................. 370/465; 370/477; 370/521; 709/247

(58) Field of Classification Search .......... 370/352, 370/389, 395.2, 395.3, 395.54, 400, 410, 370/474, 477, 465, 521; 709/247
See application file for complete search history.

(56) References Cited

U.S. PATENT DOCUMENTS

| | | | | |
|---|---|---|---|---|
| 5,130,993 A | * | 7/1992 | Gutman et al. | 714/775 |
| 5,715,230 A | * | 2/1998 | Choi | 369/30.61 |
| 5,742,773 A | * | 4/1998 | Blomfield-Brown et al. | 709/228 |
| 6,175,856 B1 | * | 1/2001 | Riddle | 709/204 |
| 6,300,887 B1 | * | 10/2001 | Le | 341/60 |
| 6,665,283 B1 | * | 12/2003 | Harris et al. | 370/333 |
| 6,721,834 B1 | * | 4/2004 | Das et al. | 710/117 |
| 2001/0049790 A1 | | 12/2001 | Faccin et al. | |
| 2002/0018010 A1 | | 2/2002 | Le | |
| 2003/0026245 A1 | | 2/2003 | Ejzak | |

OTHER PUBLICATIONS

Internet Engineering Task Force, RFC 3095, Robust Header Compression (ROHC), (BORMANN et al.), Jul. 2001.
Internet Engineering Task Force, Network Working Group, Internet-Draft, Signaling Compression, (Price et al.), May 2002.
Price et al., "Signaling Compression", RFC 3320, pp. 1-62, Jan. 2003.

* cited by examiner

*Primary Examiner*—Doris H. To
*Assistant Examiner*—Saba Tsegaye
(74) *Attorney, Agent, or Firm*—Squire, Sanders & Dempsey, LLC.

(57) ABSTRACT

A method and system for resetting nodes in a communication system that include at least a first node and a second node. The establishment for communication settings is initiated between the first node and the second node. At least part of communications settings is stored in the first node. An indication is sent from the second node to the first node to reset the stored communication settings in the first node. The communication settings are reset in the first node.

29 Claims, 6 Drawing Sheets

```
 0   1   2   3   4   5   6   7
+---+---+---+---+---+---+---+---+
|  reserved   | R | 0 | S |   | requested_feedback_location
+---+---+---+---+---+---+---+---+
```

FIG. 4

METHOD AND SYSTEM FOR RESETTING NODES IN COMMUNICATION SYSTEMS

This application claims the benefit of U.S. Provisional Patent Application Ser. No. 60/378,951 filed May 10, 2002, the contents of which is expressly incorporated by reference herein.

BACKGROUND

1. Field of the Invention

This invention relates to network systems, and more specifically to resetting nodes in communication systems.

2. Description of the Related Art

Signalling compression is used in the networks to decrease the size of application (such as SIP) messages. Signaling compression is explained in Internet Engineering Task Force (IETF) document "Signaling Compression", draft-ieff-rohc-sigcomp-06.txt, by Richard Price et al., dated May 6, 2002, and a later version of the same document, "Signaling Compression", RFC 3320, by Richard Price et al., dated January, 2003, the contents both of which are herein incorporated by reference in their entirety. It is possible that decompression failure occurs due to various reasons such as corrupted dictionaries, reset of network entity, memory leaks or invalid SigComp messages, etc. The IETF specifications do not address decompression failure, i.e., there is no indication from the decompression failure endpoint or network node to the endpoint or network node sending the compressed message. Since the uncompressed messages are not exposed (i.e., the identification of the sender, contained in the compressed message, may not be retrievable), valid SIP responses cannot be generated. Therefore, there is a need for a solution to recover from decompression failures that could result in continuous retransmissions and failures of all subsequent transactions.

SUMMARY OF THE INVENTION

A method and system for resetting nodes in a communication system that include at least a first node and a second node. The establishment for communication settings is initiated between the first node and the second node. At least part of communications settings is stored in the first node. An indication is sent from the second node to the first node to reset the stored communication settings in the first node. The communication settings are reset in the first node.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 4 is a diagram of a format for requested feedback data according to an example embodiment of the present invention;

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments of the present invention relate to resetting nodes in communication systems. This is particularly useful for recovery from Signaling Compression (SigComp) message decompression failures. To illustrate the present invention, embodiments will be discussed that related to use of the present invention for recovery from Signaling Compression (SigComp) message decompression failures, however, the present invention is not limited to these embodiments or the solving of just these type situations. The present invention may be applied in any type system or network involving two or more network nodes or devices, where one network node desires to initiate the resetting of itself and/or another network node.

Embodiments of the present invention handle SigComp messages sent over reliable transport (e.g., Transmission Control Protocol (TCP)) and unreliable transport (e.g., Universal Data Protocol (UDP)) mechanisms. Moreover, some embodiments of the present invention include the sending of a reset signal in a SigComp feedback message to recover from a decompression failure.

Figure 1:
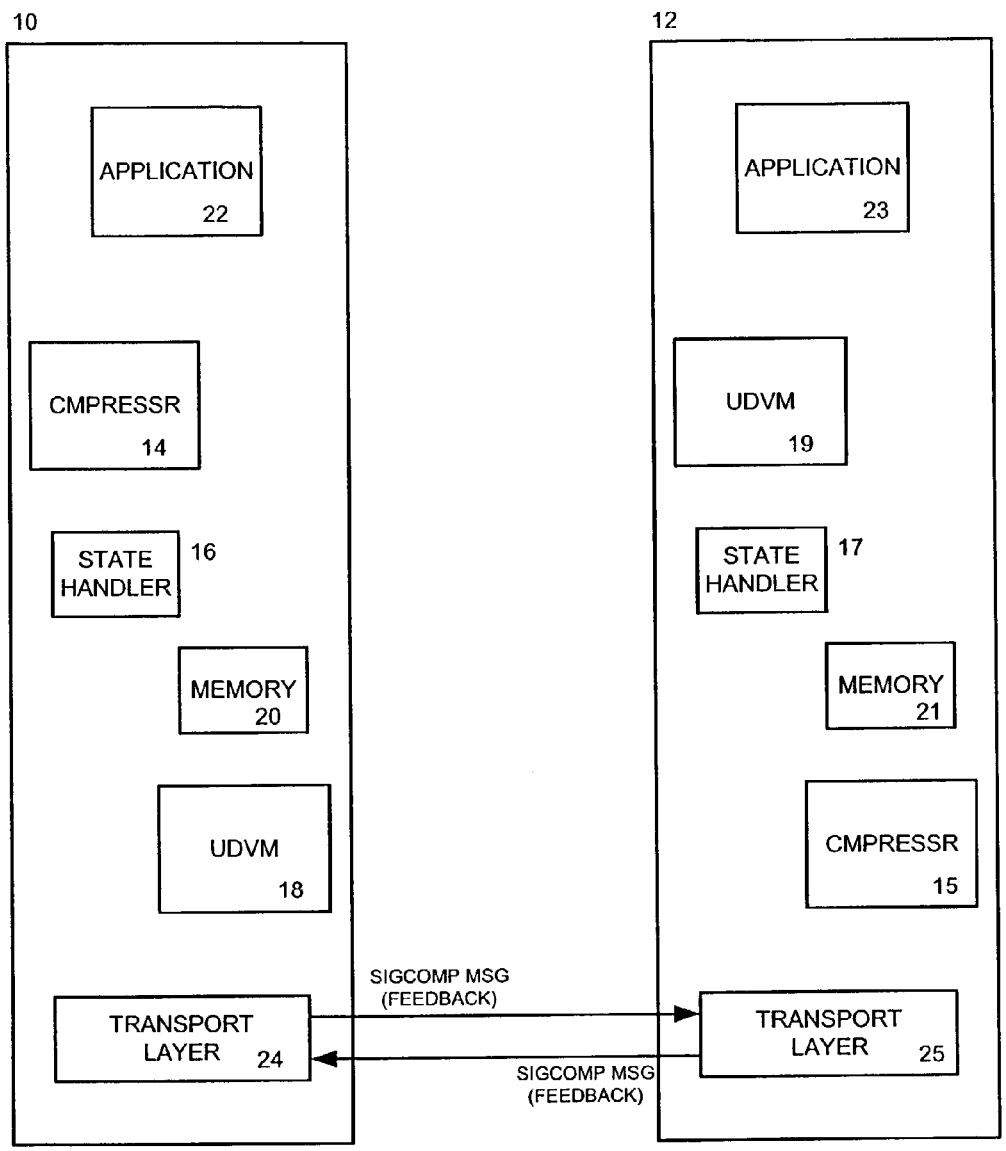
FIG. 1 is a diagram of a system for resetting of nodes according to an example embodiment of the present invention.

FIG. 1 shows a diagram of a system for resetting of nodes according to an example embodiment of the present invention. Two endpoints 10, 12 are shown that may send and receive SigComp messages between them. The endpoints may also be referred to as network nodes, network devices, first network device and second network device, or first node and second node. The endpoints may be interconnected via a communications network. Each endpoint may include a compressor 14, 15 for encoding application messages to be transmitted using a selected compression algorithm, a state handler 16, 17 for accessing and storing state information, and a Universal Decompressor Virtual Machine (UDVM) 18, 19 for decompressing SigComp messages. The compressor 14, 15 may also keep track of state that can be used for compression and may also insure that SigComp messages generated can be decompressed by the UDVM at the receiving endpoint. Each network node may also include storage 20, 21 for storing information and data such as states, communications settings, etc. Although only two endpoints are shown here, the present invention is not limited to two as there may be many endpoints in a system for resetting of nodes according to the present invention.

The endpoints may be network nodes that may include, e.g., servers, proxies, and mobile devices. To illustrate the present invention, it will be assumed that one network node/device is a Proxy Call State (or Session) Control Function (P-CSCF) and the other network node is a mobile device, where SigComp messages are transferred between the two, possibly using the Session Initiation Protocol (SIP). However, the present invention is not limited to these type endpoints/network devices or the use of this protocol.

Each network device may also include a local application 22, 23 and a transport layer 24, 25. The application 22, 23 generates and receives messages to be transmitted and received to/from another application at another network device. The messages from the application may be sent to the compressor 14, 15 for encoding before transmission. Similarly, received encoded messages are decompressed by the UDVM 18, 19 before being sent to the application 22, 23. Application-specific groupings of messages that relate to two specific network devices or endpoints (peers) form a SigComp compartment. Each compartment may have a compartment identifier that accompanies the messages for identification and authorization use by each application. The transport layer facilitates the transmission and receipt of SigComp messages and data between network devices. Any of many type transports may be used to implement the present invention, for example, Transmission Control Protocol (TCP), User Datagram Protocol (UDP), etc.

During transmission of messages, feedback data may be requested and/or included in a SigComp message. The feedback data may include information related to the capabilities of a network device, states saved at the network device, acknowledgments, etc. The feedback data may also be used to include a bit that when set requests a reset of the SigComp compartment. According to embodiments of the present invention, this bit may be set by a network device to signal a decompression failure at the network device to the network device that sent the compressed message.

The establishment for communication settings may be initiated between a first node 10 and a second node 12. At least part of the communications settings may be stored in the first node 10. An indication may be sent from the second node 12 to the first node 10 to reset the stored communication settings in the first node. The communication settings may then be reset in the first node 10.

Regarding decompression failures in unreliable transports, retransmission timers may trigger the resetting of the SigComp compartment. The endpoint may re-announce its capabilities, may not rely on any previously saved states, and may act as if no messages were sent in that compartment. Loss of the original message may not be handled differently, because the lack of response could occur due to many reasons (e.g., message is lost or delayed). If the first retransmission remains un-responded, the compartment may be reset. If still no response is received after resetting the compartment, all subsequent messages may be sent uncompressed. In unreliable transports, Session Initiation Protocol (SIP) may handle the loss of messages and retransmission. The following is an example message sequence for transmission of a SigComp message over an unreliable transport, and the occurrence of a decompression failure, according to the present invention.

Message sequence:
    Original message: -------Compressed----->X
    Retransmission #1: -------Compressed----->X
    <RESET SigComp>
    Retransmission #2: -------Compressed----->X
    <Switch to uncompressed SIP>
    Retransmission #3: -------Uncompressed----->X
    Retransmission #n: -------Uncompressed----->X During retransmissions, SigComp parameters may be changed to help facilitate successful decompression. For example, different decompression algorithms may be used, different states used, etc. If the retransmissions of compressed messages are still unsuccessful, uncompressed messages may then be retransmitted.

Figure 2:
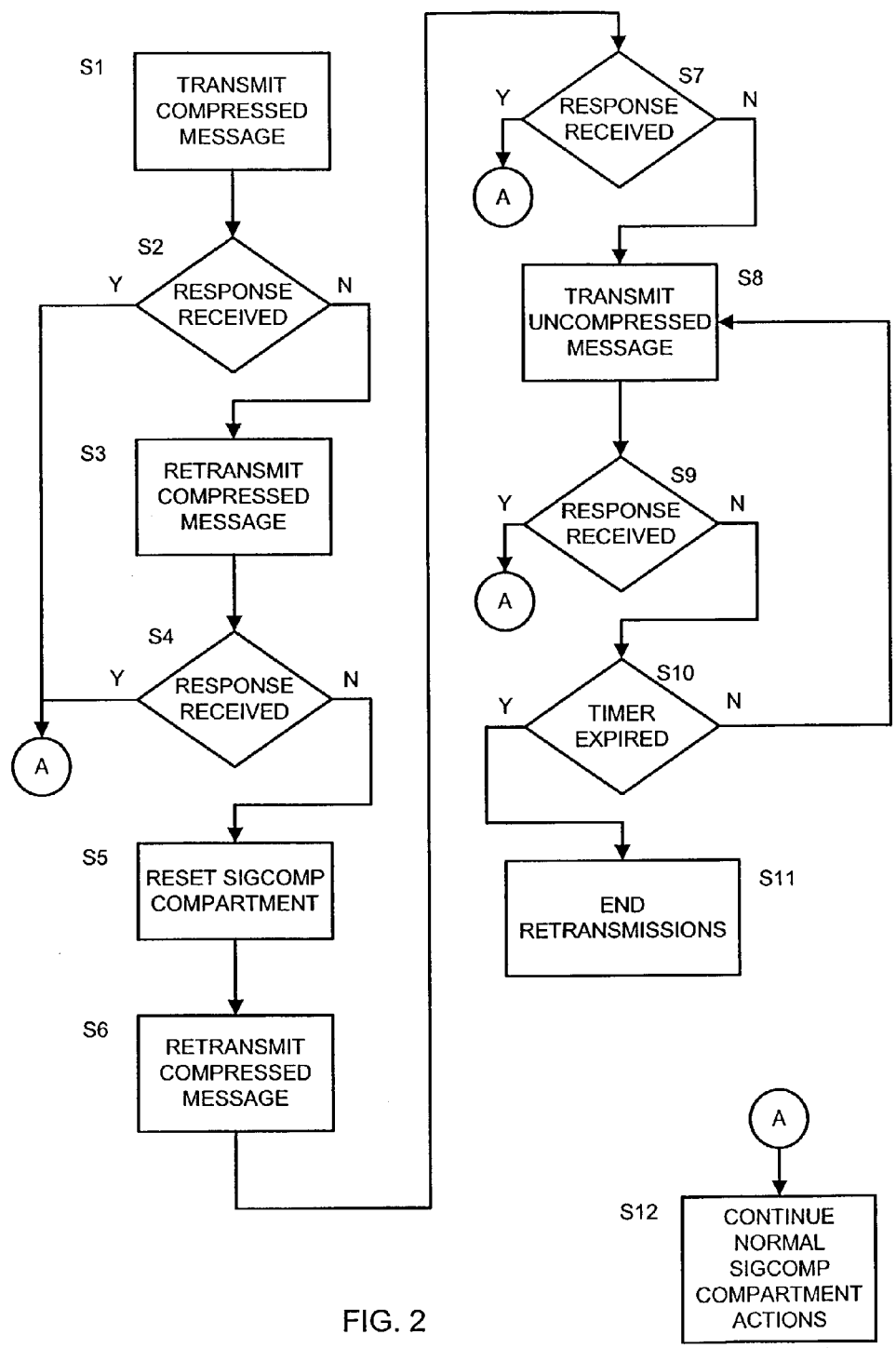
FIG. 2 is a flowchart of a process for resetting of nodes in an unreliable transport according to an example embodiment of the present invention.

FIG. 2 shows a flowchart of a process for resetting of nodes in an unreliable transport according to an example embodiment of the present invention. A compressed message is transmitted S1. It is determined if a response has been received S2, and if not, the compressed message is retransmitted S3. It is determined if a response has been received to the retransmitted compressed message S4, and if not, the SigComp compartment may be reset S5. A compressed message is retransmitted S6. It is determined if a response has been received S7, and if not, an uncompressed message is transmitted containing the original message S8. It is determined if a response has been received to the uncompressed message S9, and if not, it is determined if a timer has expired S10. If the timer has expired, retransmissions are terminated S11, otherwise, the uncompressed message is retransmitted S8. If a response has been received at any time S2, S4, S7, S9, normal SigComp compartment actions are continued S12. During retransmissions, SigComp parameters may be changed to help facilitate successful decompression. For example, different decompression algorithms may be used, different states used, etc.

Regarding decompression failures in reliable transports, TCP retransmissions are handled by the transport layer, thus the SIP layer may not perform any actions for 64*T1 time. After that a CANCEL message may be issued. According to embodiments of the present invention, a reset signal may be generated and sent to reset the compartment before CANCEL is sent. According to the present invention, the occurrence of a decompression failure in a reliable transport, may cause the resetting of the compartment. This may involve deleting all states saved by that compressor and restarting compressor. The compressor may not rely on any previously saved state at the decompressor side, and must behave like no messages were exchanged in that compartment.

Figure 3:
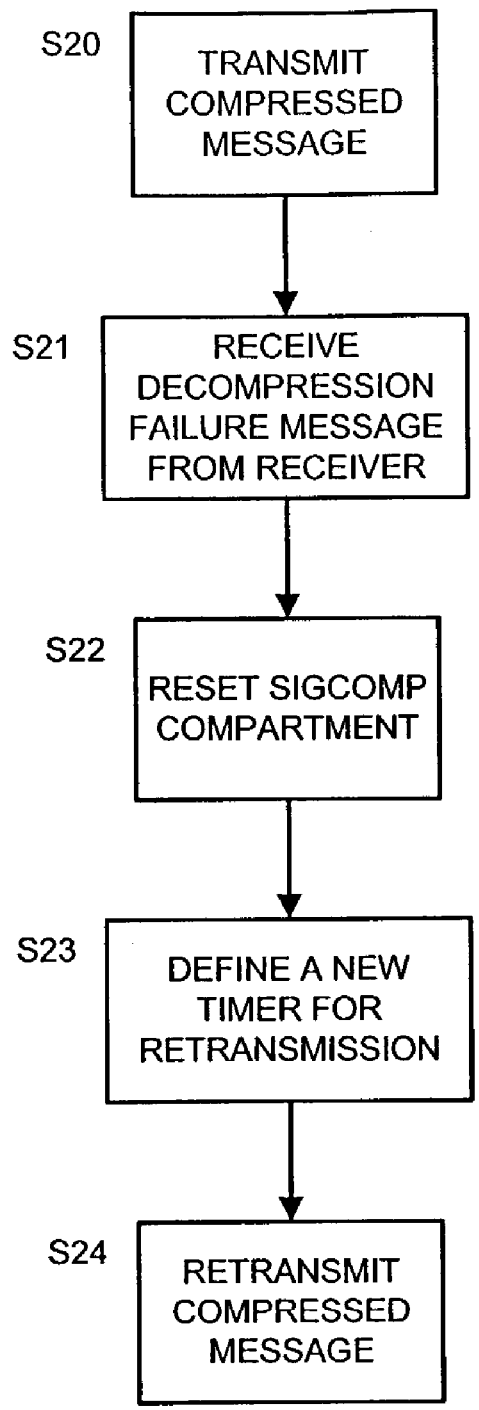
FIG. 3 is a flowchart of a process for resetting of nodes in a reliable transport according to an example embodiment of the present invention.

FIG. 3 shows a flowchart of a process for resetting of nodes in a reliable transport according to an example embodiment of the present invention. A compressed message may be transmitted over a reliable transport S20. A decompression failure message may be received at the compressed message sender from the receiver S21. The sender may reset the SigComp compartment S22. A new timer may be defined at the sender for retransmission of the compressed message to the receiver S23. The compressed message may then be retransmitted to the receiver S24. During retransmissions, SigComp parameters may be changed to help facilitate successful decompression. For example, different decompression algorithms may be used, different states used, etc.

In another embodiment of the present invention, a network node sending a compressed message may be informed of a decompression failure at the receiving network node by the receiving network node sending the other network nodes a RESET signal in a SigComp message. The SigComp message may be a standalone message (if allowed) or a regular message that carries a compressed SIP message. The RESET signal may be sent in response to unsuccessful decompression, e.g., due to corrupted dictionaries, reset of network entity or user equipment, memory leaks, etc. The RESET signal may be carried in a SigComp message that generates requested feedback data with one of the currently reserved bits set to 1. This message may be referred to as a RESET message. Moreover, preferably, the RESET message must also announce capability information of the sender endpoint via the returned SigComp parameters, must not contain references to any states other than the mandatory states in that environment (such as the static SIP dictionary), and must not contain state acknowledgments (i.e., the T-bit must be set to 0 to indicate there is no returned feedback item). The RESET message may be sent in both directions independently. Specifically, a RESET message sent in one direction may have no effect on the opposite direction. Further, in SigComp, requested feedback data may be generated using the END_MESSAGE instruction.

FIG. 4 shows a diagram of a format for requested feedback data according to an example embodiment of the present invention. A requested feedback location field contains eight bits, five of which, bits 0–4, are normally reserved. According to embodiments of the present invention, one of the reserved bits in this field, bit 4 in this example embodiment, may be used as a reset request bit, "R" that when set, causes the receiver of the feedback data to reset this SigComp compartment. Therefore, the R bit may be set to "1" by the sender to issue a RESET request. Further note that the "Q" bit is equal "0" denoting that any requested feedback item is not included.

The "S" bit and the "I" bit fields represent other bits set by the compressor. The compressor may set the "S" bit to "1" if it does not wish (or no longer wishes) to save state information at the receiving endpoint and also does not wish to access state information that it has previously saved. Similarly, the compressor may set the "I" bit to "1" if it does not wish (or no longer wishes) to access any of the locally available state items offered by the receiving endpoint. Since the "R" bit being set causes the SigComp compartment to be reset, (that may include deleting all previous states), the "S" bit and "I" bit may not be important when the "R" bit is set.

Figure 5:
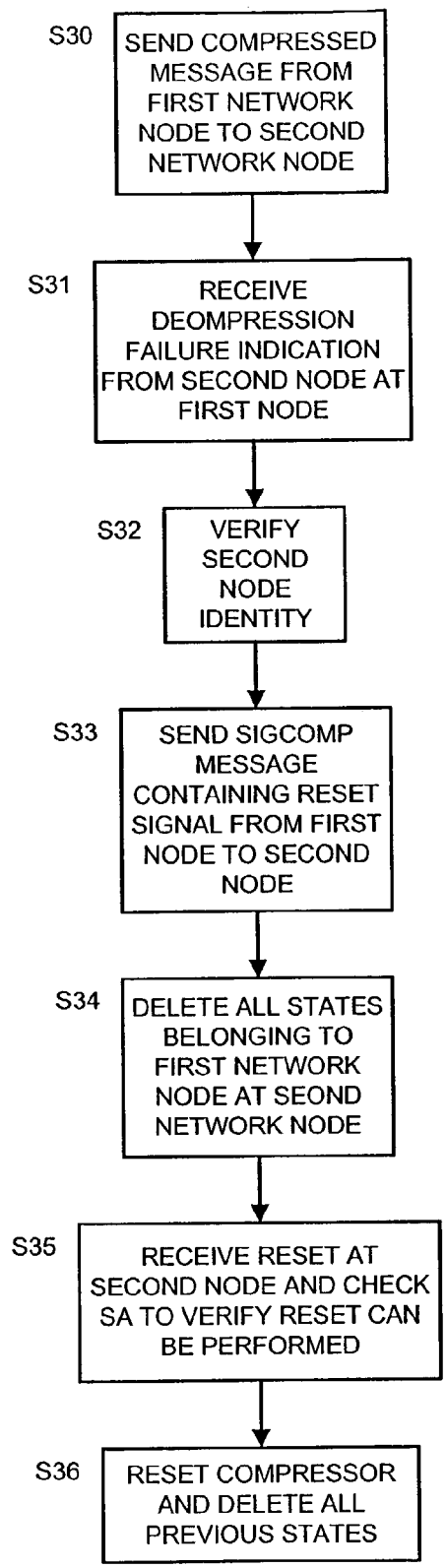
FIG. 5 is a flowchart of a process for resetting of nodes where a proxy network device initiates a reset message according to an example embodiment of the present invention.

FIG. 5 shows a flowchart of a process for resetting of nodes where a proxy network device initiates a reset message according to an example embodiment of the present invention. A compressed message may be sent from a first network node to a second network node S30. A decompression failure indication may be received from the second node at the first node S31. Upon decompression failure, the user identity (network node identity) may be detected and verified by analyzing the security association S32. A SigComp message may be generated that contains the RESET signal and send from the first network node to the second network node S33.

The security association may be used to send this message. Note that this SigComp message may contain a compressed SIP message sent to the second network node. All states belonging to second network node at first network node may be deleted S34. The reset signal is received at the second network node and the security association may be checked to verify that the reset can be performed S35. The state handler may not wait for the endpoint identifier if the R bit was set in the announcement. The second network node may check the security association where the message was sent from to insure that it belongs to an appropriate network node, thus allowing performance of the reset. The compressor at the second network node may be reset and all previous states deleted S36. UE Therefore, the second network node restarts the compressor, and behaves like no SigComp messages were exchanged previously. The second network node may not use any state that was previously saved at the first network node. The announcement of the first network node capability made by the RESET message may be passed to the compressor at the second network node.

Figure 6:
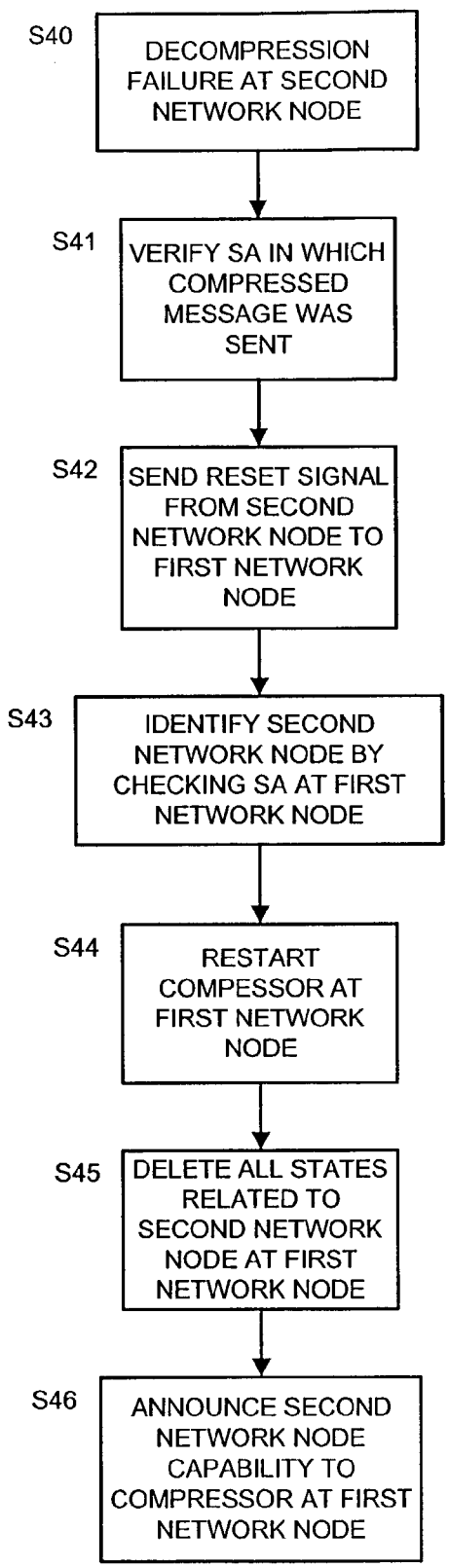
FIG. 6 is a flowchart of a process for resetting of nodes where a mobile device initiates a reset message according to an example embodiment of the present invention.

FIG. 6 shows a flowchart of a process for resetting of nodes where a mobile device initiates a reset message according to an example embodiment of the present invention. A decompression failure occurs at a second network node S40. The security association in which the compressed message was sent must be verified against the appropriate network node (i.e., the sending first network node) S41. A SigComp message may be generated that contains the RESET signal and sent from the second network node to the first network node S42. The first network node receives the reset signal and identifies the second network node by checking the security association S43. The state handler at the first network node does not wait for the compartment identifier if the R bit was set in the requested feedback data. In particular, this is true for the case of a standalone SigComp message. The compressor at first network node may be restarted S44. All states related to second network node at first network node may be deleted S45. The first network node behaves like no SigComp messages were exchanged previously. The first network node may not use any state that it saved at the second network node. The announcement of user (i.e., second network node) capability made by the RESET message may passed to the compressor at the first network node S46.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for resetting information in nodes in a system that includes at least a first node and a second node, the method comprising:
   initiating the establishment for communication settings between the first node and the second node;
   storing at least part of communications settings in the first node;
   checking a security association of the first node to verify that a reset is performable;
   sending an indication from the second node to the first node to reset the stored communication settings in the first node;
   identifying the second node by checking a security association at the first node; and
   resetting the communication settings in the first node,
   wherein the resetting causes the first node to delete all states belonging to the second node,
   wherein at least one of the first node or the second node comprises a mobile node.

2. The method according to claim 1, comprising:
   storing the at least part of the communication settings in the second node; and
   resetting the communication settings in the second node.

3. The method according to claim 2, comprising sending an indication from the first node to the second node to reset the stored communication settings in the second node.

4. The method according to claim 1, wherein the indication is a RESET signal.

5. The method according to claim 1, wherein the first node is the mobile node and the second node is a Proxy-CSCF.

6. The method according to claim 1, wherein the first node is a P-CSCF and the second node is a mobile node.

7. The method according to claim 1, wherein the indication is sent in a SigComp message.

8. The method according to claim 1, wherein the indication is sent in response to unsuccessful decompression.

9. The method according to claim 1, wherein the communication settings are settings related to compression of the communication between the first node and the second node.

10. The method according to claim 1, further comprising:
    announcing a capability of the second to a compressor at the first node.

11. The method according to claim 10, wherein the announcing takes place after a restart of the compressor at the first node and after deletion of all states related to the second node at the first node.

12. The method according to claim 10, wherein the compressor encodes application messages to be transmitted using a selected compression algorithm.

13. A system for resetting information in nodes in a network, the system comprising:
    a first node, the first node operatively connected to the network;
    a second node, the second node operatively connected to the network;
    means for initiating the establishment for communication settings between the first node and the second node;
    means for storing at least part of communications settings in the first node;
    means for checking a security association of the first node to verify that a reset is performable;
    means for sending an indication from the second node to the first node to reset the stored communication settings in the first node;
    means for identifying the second node by checking a security association at the first node; and
    means for resetting the communication setting in the first node,
    wherein the resetting causes the first node to delete all states belonging to the second node,
    wherein at least one of the first node or the second node comprises a mobile node.

14. The system according to claim 13, comprising:
    means for storing the at least part of the communication settings in the second node; and
    means for resetting the communication settings in the second node.

15. The system according to claim 13 wherein the indication is a RESET signal.

16. The method according to claim 1, wherein the first node is the mobile node and the second node is a Proxy-CSCF.

17. The method according to claim 1, wherein the first node is a P-CSCF and the second node is the mobile node.

18. The system according to claim 13, wherein the indication is sent in a SigComp message.

19. The system according to claim 13, wherein the indication is sent in response to unsuccessful decompression.

20. The system according to claim 13, wherein the communication settings are settings related to compression of the communication between the first node and the second node.

21. The system according to claim 13, further comprising:
    means for announcing a capability of the second node to a compressor at the first node.

22. A network node operatively connected to a network comprising:
    means for initiating the establishment for communication settings between the network node and a second network node;
    means for storing at least part of the communications settings;
    means for permitting a security association of the network node to be checked by the second network node to verify that a reset is performable;
    means for receiving an indication from the second network node to reset the stored communication settings;
    means for identifying the second node by checking a security association at the network node; and
    means for resetting the communication settings,
    wherein the resetting causes the network node to delete all states belonging to the second network node,
    wherein at least one of the first node or the second node comprises a mobile node.

23. The network node according to claim 22, wherein the indication is a RESET signal.

24. The method according to claim 1, wherein the first node is the mobile node and the second node is Proxy-CSCF.

25. The method according to claim 1, wherein the first node is a P-CSCF and the second node is the mobile node.

26. The network node according to claim 22, wherein the indication is sent in a SigComp message.

27. The network node according to claim 22, wherein the indication is sent in response to unsuccessful decompression.

28. The network node according to claim 22, wherein the communication settings are settings related to compression of the communication between the network node and the second network node.

29. The network node according to claim 22, further comprising:

means for announcing a capability of the second node to a compressor at the first node.

* * * * *